Oct. 31, 1933.   J. L. PETERSON   1,933,183
STOCK FEEDING MECHANISM FOR MACHINE TOOLS
Filed Feb. 18, 1932   3 Sheets-Sheet 3
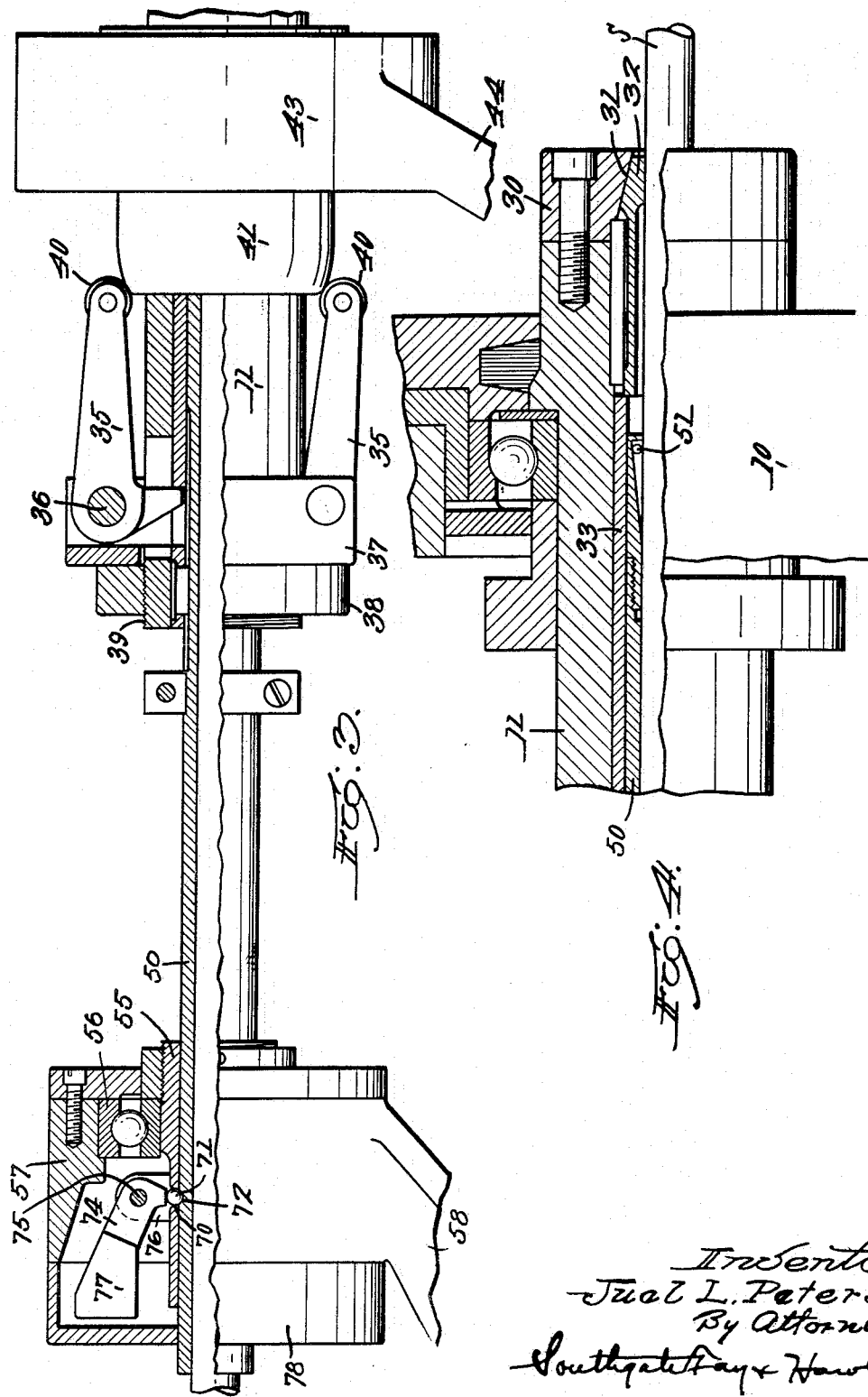

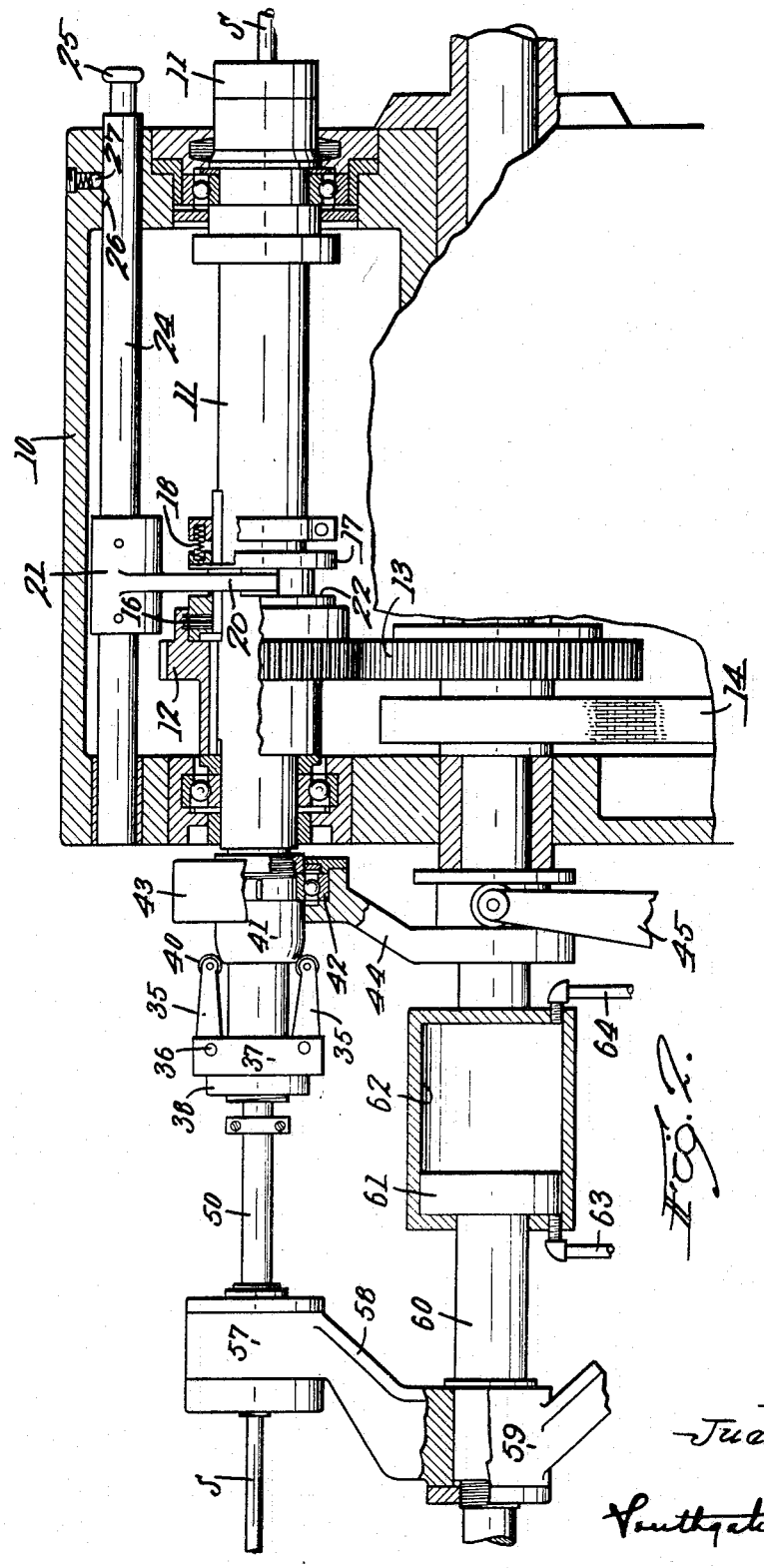

Patented Oct. 31, 1933

1,933,183

UNITED STATES PATENT OFFICE 1,933,183

STOCK FEEDING MECHANISM FOR MACHINE TOOLS

Juel Leland Peterson, Seneca Falls, N. Y., assignor to Seneca Falls Machine Company, Seneca Falls, N. Y., a corporation of Massachusetts Application February 18, 1932. Serial No. 593,817

13 Claims. (Cl. 29—61)

This invention relates to mechanism for feeding stock to a machine tool, such as a multiple spindle lathe, in which the stock is continuously rotated at substantial speed during normal feeding and working operations.

It is the object of my invention to provide means for automatically preventing the feed of stock to any work spindle whenever the spindle is not in continuous rotation. My invention also effects restoration of normal stock feed as soon as the work spindle is again continuously rotated.

In the carrying out of my invention, I utilize centrifugally operated connections in the stock feeding mechanism, which connections become inoperative when the work spindle ceases to rotate.

My invention further relates to arrangements and combinations of parts which will be hereinafter described and more particularly pointed out in the appended claims.

A preferred form of the invention is shown in the drawings, in which

Fig. 2 is a sectional side elevation of the mechanism shown in Fig. 1,

Fig. 3 is a side elevation, partly in section, of one of the work-supporting and work-rotating spindles and the feeding mechanism associated therewith, and Fig. 4 is an enlarged side elevation, partly in section, of the outer end of the work spindle and of the work-engaging collet.

Figure 1:
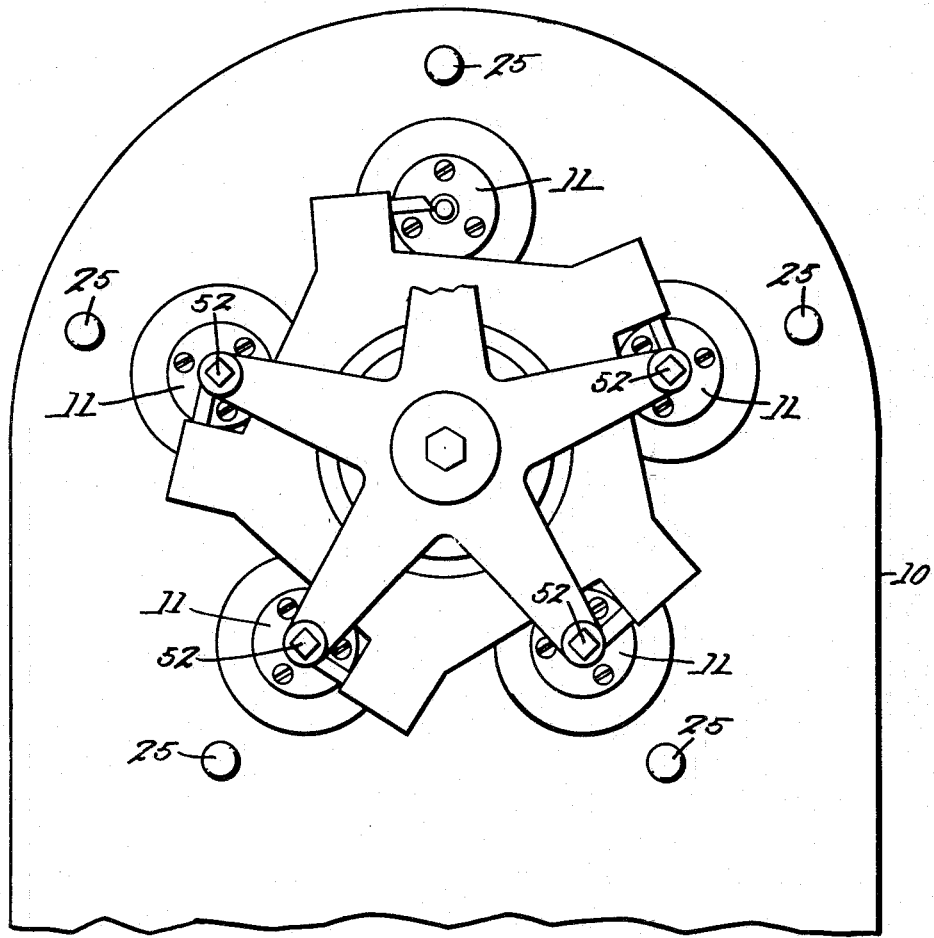
Fig. 1 is a partial end elevation of a multiple spindle lathe embodying my improvements.

Referring to the drawings, I have shown parts of a multiple spindle lathe comprising a frame 10 in which a plurality of work spindles 11 are rotatably mounted. Each work spindle 11 (Fig. 2) is supported on spaced bearings in the frame 10, and is provided with a pinion 12 loose thereon and engaged by a driving gear 13 mounted to rotate about the main axis of the machine and continuously driven in any convenient manner as by a belt 14.

Each gear 12 is normally connected to its spindle 11 through a disc clutch 16 (Fig. 2), and a collar 17 keyed to the spindle 11 and pressed against the clutch 16 by a plurality of springs 18.

A yoke 20 is mounted on a hub 21 and extends into a groove 22 in the collar 17. The hub 21 is secured to a bar 24, slidable in fixed bearings in the frame 10. The bar 24 is provided at its outer end with a handle or knob 25 and has a recess 26 adapted to receive a spring-pressed ball 27 when the bar is pulled out.

One of these sliding bars and handles or knobs is provided for each work spindle in the machine, so that any spindle may be selectively stopped by pulling forward the bar 24 associated therewith. The bar will be held in forward position by its locking ball 27, which engages the bar with sufficient force to restrain the springs 18.

A plate 30 (Fig. 4) is mounted at the front end of each spindle 11 and has a conical recess 31 adapted to receive the conical outer end of a spring collet 32 by which the stock S is engaged and rotated. The rear end of the collet 32 is engaged by a sleeve 33 slidable in the spindle 11 and having its rear end engaged by bell cranks 35 (Fig. 3) pivoted at 36 in a collar 37 axially adjustable on the spindle 11 but rotatable therewith. The collar 37 is adjusted and secured in position by a locking collar 38 mounted on a threaded end portion 39 of the spindle 11.

The forward ends of the bell cranks 37 are provided with rolls 40 engaged by the cam-shaped rear end of a sleeve 41, slidable on the spindle 11 and rotatable in an anti-friction thrust bearing 42 (Fig. 2) in an arm 43 of a spider 44 having its hub slidable along the main axis of the machine and actuated by a release lever 45 which is given intermittent movements by a suitable cam or other actuating element.

When the sleeve 41 is pushed rearward or to the left in Figs. 2 and 3, the rolls 40 will be forced outward and the inwardly extending arms of the bell cranks 35 will push the sleeve 33 forward, thus crowding the collet 32 into the conical recess 31, which contracts the collet and causes the same to engage and drive the stock S.

The stock S is slidable in a stock-feeding tube 50 having a ball clutch or other device 51 at its forward end adapted to engage and feed the stock on a feeding stroke and to slip idly backward over the stock as the tube 50 is withdrawn. A suitable stop 52 (Fig. 1) may be provided to definitely limit the forward feeding movement of the stock in each work spindle.

A sleeve 55 (Fig. 3) is slidable on the stock-feeding tube 50 but is rotatable therewith. The tube 50 is keyed to the work spindle 11, so that both the tube 50 and sleeve 55 rotate with the spindle 11 and with the stock S.

The sleeve 55 is mounted in an anti-friction bearing 56 in an arm 57 of a work-feeding spider 58 (Fig. 2) having its hub 59 secured to a piston rod 60 slidable along the main axis of the machine and provided with a piston 61 in a cylinder 62 having pipes 63 and 64 connected to its opposite ends.

By admitting fluid under pressure through one or the other of these pipes, the spider 58 may be reciprocated to give the several sleeves 55 for the different spindles simultaneous feeding and return movements. Suitable valve and control mechanism (not shown) is provided for controlling the movements of the piston 61 and work-feeding sleeves 55.

Each sleeve 55 (Fig. 3) is provided with one or more openings 70 adapted to receive balls or other clutch members 71, and each stock-feeding tube 50 is similarly provided with depressions or recesses 72, aligned with the openings 70 and in which the balls 71 may be seated.

Centrifugally operated levers or arms 74 are pivoted at 75 on ears 76 on the sleeve 55 and are provided with substantial weighted portions 77, free to swing outward in a chambered portion of the arm 57 and in a cap or casing member 78 mounted thereon. The inner ends of the levers 74 engage the balls 71, as clearly shown in Fig. 3.

Having described the details of construction of my improved stock-feeding mechanism, the operation and advantages thereof are as follows:

During the normal operation of the machine, all of the clutches 16 will be engaged and all of the spindles 11, stock-feeding tubes 50 and sleeves 55 will be continuously rotated. As the centrifugal levers 74 are mounted on the sleeves 55, they will also be rotated about the axes of their associated spindles, and will force the corresponding balls 71 inward, holding them firmly seated in the recesses or pockets 72 in the stock-feeding tubes 50. Consequently the feeding movements of the spider 58 will be directly communicated to the stock-feeding tubes 50, and the stock S in all of the spindles 50 will be intermittently fed forward into engagement with the stops 52.

It may at times, however, be desirable to stop the rotation of one of the spindles 11 for repair or replacement of tools or for other reasons. This is readily accomplished by grasping the corresponding knob or handle 25 and drawing the associated bar 24 outward to disconnect the corresponding clutch 16. This particular spindle 11 then comes to rest but its feeding tube 55 continues to reciprocate with the work-feeding spider 58.

As soon, however, as the spindle comes to rest, the sleeve 55 and centrifugal levers 74 cease to rotate, and consequently the locking balls 71 are released and slip outward from the pockets 72 in which they have been seated. The balls thereafter roll freely along the stock-feeding tubes 50 but without communicating axial movement thereto, until the spindle 11 is again placed in rotation.

Consequently the feed of any work spindle is automatically disconnected and rendered inoperative whenever the spindle is brought to rest or ceases to rotate at substantially its normal speed.

I have thus provided very simple means for simultaneously feeding stock to a plurality of spindles in a multiple spindle machine tool and for limiting the stock feed to such spindles as are in active rotation.

Having thus described my invention and the advantages thereof, I do not wish to be limited to the details herein disclosed, otherwise than as set forth in the claims, but what I claim is:—

1. In a machine tool, a rotated work spindle, automatic stock-feeding mechanism, and separate and additional means to drive said feeding mechanism, said separate means being controlled as to effective operation by the rotation of the work spindle, but actuated independently thereof.

2. In a machine tool, a rotated work spindle, a stock-feeding member for said spindle, continuously moving, regularly-actuated means to move said stock-feeding member, and means to connect said actuating means to said stock-feeding means, said connecting means being effectively operative only while said work spindle is being rotated, but being actuated independently thereof.

3. In a machine tool, a rotated work spindle, a stock-feeding member for said spindle, continuously moving, regularly-actuated means to move said stock-feeding member, and means to connect said actuating means to said stock-feeding means, said connecting means being rendered effectively operative by centrifugal force when said spindle is rotated and being otherwise inoperative but being actuated independently of said spindle.

4. In a machine tool, a rotated work spindle, a feeding member slidable axially of said spindle, means to reciprocate said feeding member, a stock-engaging device, and centrifugally operated means effective to connect said feeding member to said stock-engaging device only when said latter means is rotated.

5. In a machine tool, a rotated work spindle, a feeding member slidable axially of said spindle, means to reciprocate said feeding member, a stock-engaging device, and means rotatable with said spindle and effective to connect said feeding member to said stock-engaging device when said spindle is rotated and to disconnect said feeding member from said device when said spindle is at rest.

6. In a machine tool, a rotated work spindle, a feeding member slidable axially of said spindle, means to reciprocate said member, a stock-engaging device, means to clutch said member to said device, and centrifugally-operated elements rotatable with said spindle and rendering said clutching means effective only when said spindle is rotating.

7. In a machine tool, a rotated work spindle, a feeding member slidable axially of said spindle, means to regularly reciprocate said member, a stock-engaging device, and means to clutch said feeding member to said device, said clutching means including centrifugally operated elements rendering said clutching means effective only when said elements are rotated and means to rotate said elements simultaneously with said spindle.

8. In a machine tool, a rotated work spindle, a feeding member slidable axially of said spindle, means to regularly reciprocate said member, a stock-engaging device, and means to clutch said feeding member to said device, said clutching means being mounted to rotate simultaneously with said spindle and comprising centrifugally-operated elements rendering said clutching means effective only when said elements are rotated about the axis of said spindle.

9. In a machine tool, a rotated work spindle, a feeding member slidable axially of said spindle, means to regularly reciprocate said member, a stock-engaging device, and means to clutch said feeding member to said device, said clutching means including weighted arms rotatable with said spindle about the axis thereof, and clutch elements rendered effective by said arms when said arms are swung outward by centrifugal force.

10. In a machine tool, a rotated work spindle, a work-engaging member slidable axially thereof and having a recess therein, a sleeve slidable on said work-engaging member and having a corresponding recess, a locking element effective to connect said sleeve and said work-engaging member together when positioned in said recess, and a centrifugally operated device effective to hold said locking element in locking position in said recesses so long as said spindle rotates at substantial speed.

11. In a machine tool, a rotated work spindle, a work-engaging member slidable axially thereof and having a recess therein, a sleeve slidable on said work-engaging member and having a corresponding recess, a locking ball mounted in the recess of said sleeve, and a centrifugally operated member rotatable with said spindle and effective when rotated at substantial speed to force said ball into said first-named recess, thereby locking said sleeve and work-engaging member together so long as spindle rotation at substantial speed is maintained.

12. In a machine tool, a plurality of work spindles, means to rotate all of said spindles, means to feed stock to all of said spindles while said spindles are rotating, means to stop any selected spindle, and automatic means to interrupt the feed to any spindle so long as said spindle remains at rest.

13. In a machine tool, a plurality of work spindles, means to rotate all of said spindles, a single reciprocated work feeding device, connections from said device to feeding mechanisms associated with each work spindle, whereby pieces of a stock in all of said spindles are fed forward intermittently and simultaneously, and centrifugally operated elements in said feeding mechanisms, each effective to render its associated feeding mechanism inoperative when the associated work spindle is at rest.

JUEL LELAND PETERSON.